(12) United States Patent
Zanotti

(10) Patent No.: US 9,017,152 B2
(45) Date of Patent: Apr. 28, 2015

(54) METHOD AND APPARATUS FOR STUNNING POULTRY

(71) Applicant: Massimo Zanotti, Gussago (IT)

(72) Inventor: Massimo Zanotti, Gussago (IT)

(*) Notice: Subject to any disclaimer, the term of this patent is extended or adjusted under 35 U.S.C. 154(b) by 0 days.

(21) Appl. No.: 14/278,779

(22) Filed: May 15, 2014

(65) Prior Publication Data

US 2014/0342647 A1   Nov. 20, 2014

(30) Foreign Application Priority Data

May 16, 2013   (IT) .............................. TO2013A0393

(51) Int. Cl.
    *A22B 3/00*   (2006.01)
(52) U.S. Cl.
    CPC ...................................... *A22B 3/005* (2013.01)
(58) Field of Classification Search
    USPC ............................................... 452/66, 57, 52
    See application file for complete search history.

(56) References Cited

U.S. PATENT DOCUMENTS

| | | | |
|---|---|---|---|
| 5,487,699 A * | 1/1996 | Tyrrell et al. ................... | 452/66 |
| 5,643,072 A * | 7/1997 | Lankhaar et al. ............... | 452/66 |
| 6,174,228 B1 * | 1/2001 | Grimsland et al. ............. | 452/66 |
| 7,097,552 B2 * | 8/2006 | Ovesen et al. .................. | 452/66 |
| 7,331,848 B2 * | 2/2008 | Zachariassen et al. ......... | 452/66 |
| 7,448,943 B1 * | 11/2008 | Woodford et al. .............. | 452/66 |
| 7,717,773 B2 * | 5/2010 | Woodford et al. .............. | 452/66 |
| 8,113,926 B1 | 2/2012 | Cheek et al. | |
| 2008/0108289 A1 | 5/2008 | Zachariassen et al. | |

FOREIGN PATENT DOCUMENTS

| | | |
|---|---|---|
| EP | 0867113 A2 | 2/1998 |
| EP | 1330952 A2 | 1/2003 |
| EP | 2456299 | 5/2012 |
| JP | H0272822 A | 3/1990 |

OTHER PUBLICATIONS

Italian Search Report for TO20130393 dated Feb. 19, 2014.

* cited by examiner

*Primary Examiner* — Richard Price, Jr.
(74) *Attorney, Agent, or Firm* — Smith, Gambrell & Russell LLP.

(57) ABSTRACT

A method for stunning poultry in a slaughterhouse by means of supplying a stunning gas into a closed chamber wherein the poultry is advanced through a plurality of successive ambients between an inlet, wherein the stunning gas concentration is at a minimum, and an outlet, at which the stunning gas concentration is at a maximum. The stunning gas concentration increases progressively from each ambient to the successive ambient, initially with a minimum increase rate and thereafter with a higher increase rate up to the maximum concentration.

13 Claims, 3 Drawing Sheets

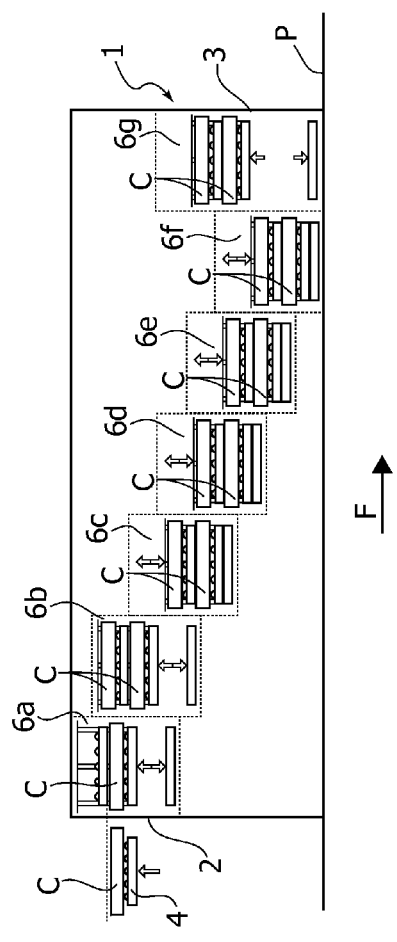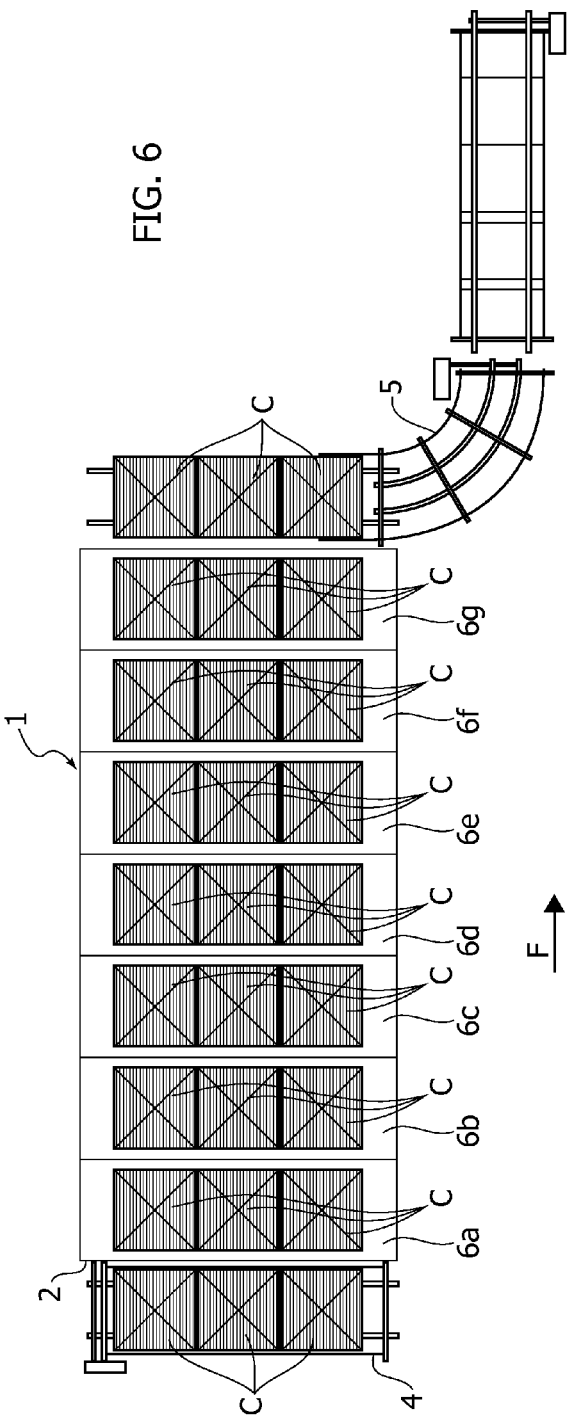

METHOD AND APPARATUS FOR STUNNING POULTRY

CROSS REFERENCE TO RELATED APPLICATIONS

This application claims priority from Italian Patent Application No. TO2013A000393 filed on May 16, 2013, the entire disclosure of which is incorporated herein by reference.

FIELD OF THE INVENTION

The present invention relates in general to poultry-slaughtering systems, and particularly concerns a method and an apparatus for stunning poultry for the purpose of making them insensitive to subsequent jugulation and exsanguination operations.

STATE OF THE ART

The methods generally used for stunning envisage electronarcosis, which consists in applying electrical current to the animals, and stunning by gas, which envisages the transiting of poultry through a closed chamber with a controlled atmosphere containing $CO_2$ in air and/or other inert gases, the concentration of which is variable.

Gas-stunning systems currently in use essentially operate according to three modes, exemplified in the diagrams of the accompanying FIGS. 1, 2 and 3, which schematically show the trend of the $CO_2$ concentration as a function of the time that the poultry stay in the chamber.

A first method (FIG. 1) envisages, after the entry of poultry into the chamber, two successive steps in a constant $CO_2$ concentration: in the first step, the $CO_2$ concentration is about 30% with the addition of about 25% oxygen, and in the second step, the concentration is about 70% of $CO_2$ only in air. The passage from the lower to the higher concentration takes place suddenly.

A second method (FIG. 2) instead envisages, during the advancement through successive poultry chambers, maintained at the same level except for lowering at the inlet and raising at the outlet, the elevation of the $CO_2$ concentration in successive steps from a minimum value of the order of 15% up to the maximum value of about 70%. In this case as well, the passage from each lower concentration to the successive higher concentration occurs with sudden jumps.

In a third method (FIG. 3), the $CO_2$ concentration increases progressively during the course of the passage of the poultry from the inlet to the outlet of a single chamber, with a constant rate, from about 10% up to 70%, with a sudden decrease immediately before the outlet from the chamber.

The document U.S. Pat. No. 6,174,228 describes a method and an apparatus for stunning poultry in which the $CO_2$ concentration is increased in three successive steps: in a first step the $CO_2$ concentration is between 18 and 22%, in the second step it is between 35 and 40%, and in the third step it is about 50%. The increase in $CO_2$ concentration can be continuous or discontinuous.

Similar methods, where the $CO_2$ concentration is also increased in successive steps, are described in the documents US-2008/108289 and JP-H0272822.

All of these known methods have proved to be not entirely satisfactory for opposite reasons: the stunning of chickens at the outlet of the chamber can sometimes be insufficient, with the risk of a regaining of consciousness that not only causes suffering during slaughter, but also inconveniences the operators, or could in fact cause early death of the chickens and the consequent block of blood flow, which prevents the successive complete bleeding, with consequent problems of processing and preserving the meat.

SUMMARY OF THE INVENTION

The purpose of the present invention is to overcome the aforesaid drawbacks, and to make a method and an apparatus available for stunning poultry by means of gas by which it is possible to obtain appreciably better results in terms of reliability and homogeneity.

According to a first aspect, the invention consists of a stunning method of the type defined in the preamble of claim 1, whose unique characteristic lies in the fact that the poultry is advanced through a plurality of successive ambients of said chamber, in the first ones of which the stunning gas concentration increases progressively from each chamber to the successive chamber, initially with a minimum increase rate and thereafter with a higher increase rate, up to the maximum concentration.

The minimum increase rate is conveniently of the order of 10%, up to a concentration of stunning gas of about 40%, after which the increase rate becomes higher.

Within each of the ambients of the chamber, the poultry is maintained for a time of the order of one minute.

Since, as already stated, the stunning gas is typically $CO_2$, which, being heavier than air, tends to move downwards, the poultry within the successive ambients of the chamber is progressively lowered from a maximum height level with the inlet, to a minimum height before the outlet from the chamber, in order to expose the poultry to increasing concentrations of the stunning gas.

According to another aspect, the invention envisages an apparatus configured for implementing the method defined above, comprising a chamber subdivided into a plurality of successive ambients in which the poultry temporarily stay, in the first ones of which the concentration of stunning gas increases progressively, initially with an minimum increase rate from each chamber to the successive chamber, and successively with a higher increase rate up to the maximum concentration.

The chamber is conveniently provided with stepwise-advancing means of drawer-like cages containing the poultry through the successive ambients, and for maintaining them within each of said ambients for a preset time, typically of the order of one minute.

Each of the said successive ambients extends lower than the previous one, and the advancing means are configured to progressively lower the drawer-like cages within each of these successive ambients.

The chamber is conveniently sized to accommodate, within each of the said ambients, groups of drawer-like cages in superimposed rows, and is advantageously located essentially at the same level of the slaughterhouse floor.

BRIEF DESCRIPTION OF THE DRAWINGS

The invention will now be described in detail with reference to the accompanying drawings, wherein:

FIG. 5 is a schematic view in vertical section, which exemplifies the gas-stunning chamber of the apparatus according to the invention, and FIG. 6 is a schematic view in horizontal section of this chamber.

DETAILED DESCRIPTION OF THE INVENTION

Figure 2:
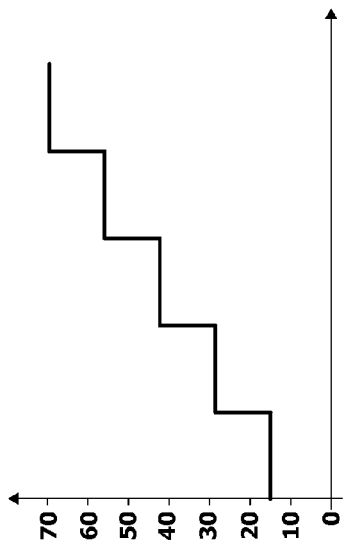
FIGS. 1, 2 and 3 are three diagrams that show the concentration trend of the stunning gas according to the previously described prior art.
Figure 3:
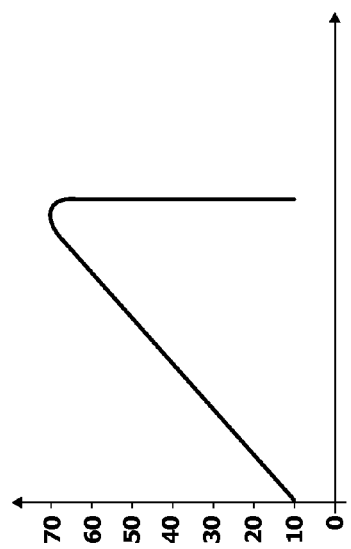
Figure 1:
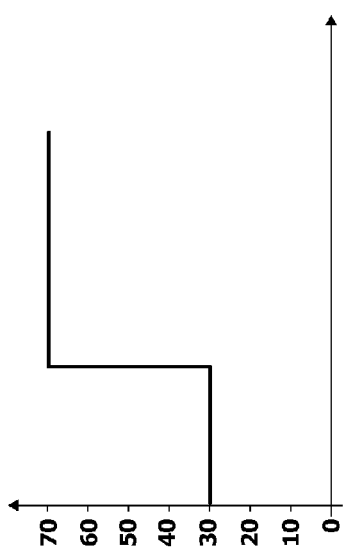

Referring initially to FIGS. 5 and 6, the apparatus for stunning poultry in a slaughterhouse, as schematically summarized in these figures, comprises a closed chamber having an inlet side 2 and an outlet side 3.

The chamber 1 is suitable for use in the setting of a slaughterhouse, where the poultry from breeding farms is transferred into drawer-like cages indicated by C, typically of the type described and illustrated in the documents EP-2456299, EP-1330952 and EP-0867113.

The drawer-like cages C containing the poultry are normally fed to the inlet 2 of the chamber 1 by means of a motorized conveyor 4, and then moved towards the outlet 3 in the direction indicated by the arrow F. Conveniently, the drawer-like cages C that move through the chamber 1 are arranged in groups of two rows superimposed transversely to the advancing direction F, each of which includes, for example, three drawer-like cages C.

At the outlet 3 of the chamber 1, drawer-like cages C are deposited on another conveyor 5 to be transferred to the successive chicken jugulation and exsanguination stations.

According to the invention, the chamber 1 is subdivided, between the inlet 2 and the outlet 3, into a series (in the illustrated example, seven in number) of successive ambients 6a, 6b, 6c, 6d, 6e, 6f, 6g at which each group of drawer-like cages C, introduced into the chamber 1 through the inlet 2, remains temporarily in the advancing course towards the outlet 3.

In the ambients 6a-6g, which may or may not be physically separable from each other, during the stay of the respective drawer-like cages C during their transfer from inlet 2 to outlet 3, a stunning gas is fed, by means of a supply system not illustrated, as it is of the usual type and within the scope of the expert in the field.

The concentration of the stunning gas, normally $CO_2$, within the successive ambients 6a-6g, increases progressively from the inlet 2 to the outlet 3 in the chamber 1, with a gradually rising increase rate.

Typically, the initial concentration, or rather within the first ambient 6a, can be of the order of 10%, while the final concentration within the last ambient 6g can be of the order of 70% or above.

Figure 4:
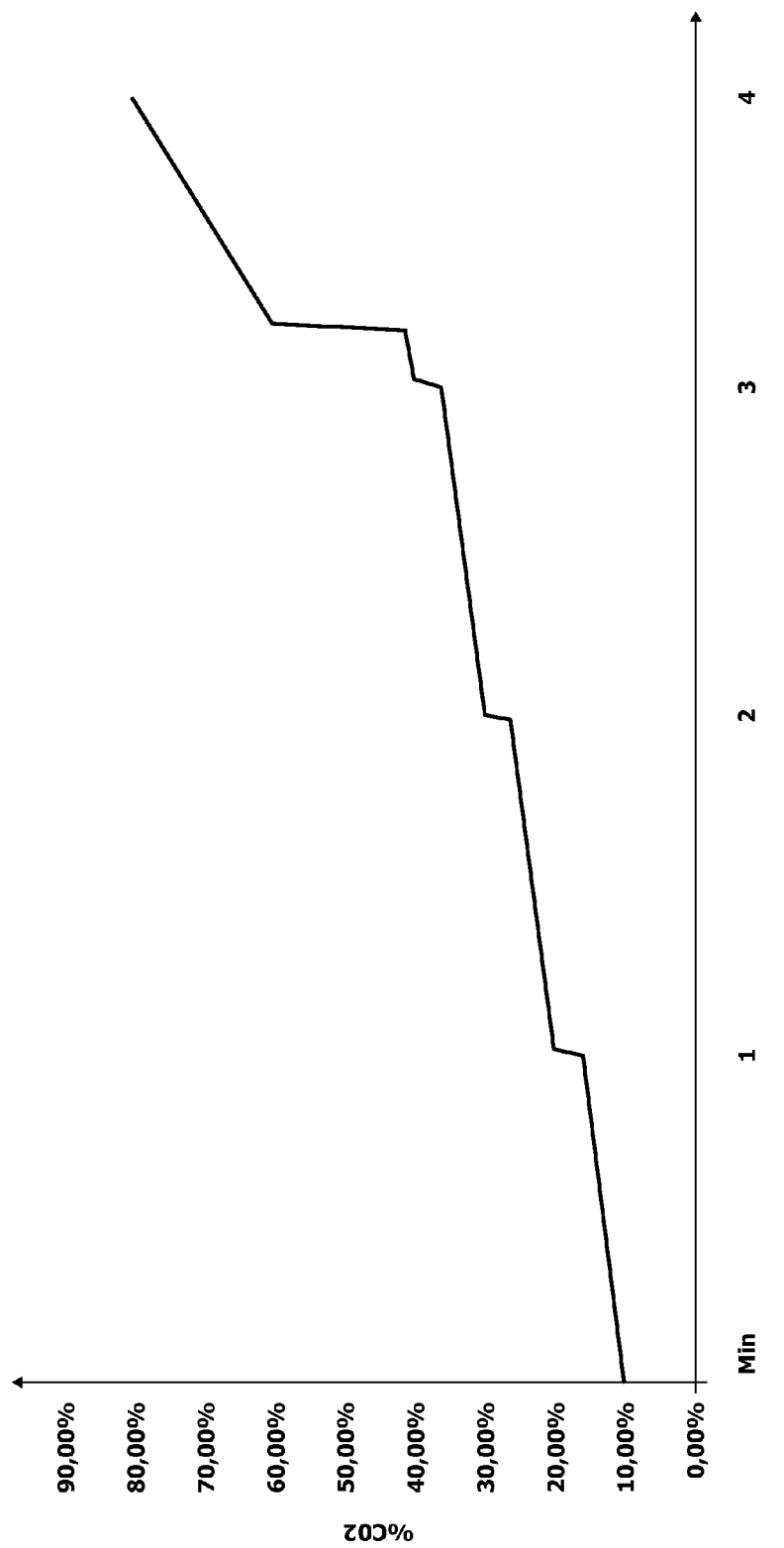
FIG. 4 is an analogous diagram showing the concentration trend of the stunning gas according to the invention.

According to the unique aspect of the invention in the first ambients, for example in the ambients 6a, 6b and 6c, the increase rate of concentration of the stunning gas is minimal, typically of the order of 10%: as is indicated in the diagram of FIG. 4, it gradually increases in each of these ambients by about 5%, and then increases more rapidly by another 5% in the transition from one ambient to the successive one. Subsequently, on reaching a concentration of the order of 40%, or rather passing to the ambient 6d and to successive ambients, the increase rate of concentration is higher and is, for example, equal to 20%, with an increasingly more important progression until the final maximum concentration.

In this way, the initial stunning step, being more delicate for the respect of the animals, is carried out in a gentle and gradual manner, while the final step can be completed more rapidly in order to reduce the total treatment time.

During the advancement from the inlet 2 to the outlet 3, the drawer-like cages C with the poultry remain in a stationary condition within each successive ambient 6a-6g for a time of the order of one minute.

The advancement of the drawer-like cages C along the chamber 1 is implemented with the aid of a stepwise motorized conveyor, not shown in detail as it is within the scope of the expert in the field, also configured to vary the height position of the drawer-like cages C while they proceed from the inlet 2 to the outlet 3 of the chamber 1 through the successive ambients 6a-6g, each of which extends lower than the previous one in the manner represented schematically in FIG. 5. The advancing system is then arranged, also in this case in a manner within the scope of the expert in the field, to lower the drawer-like cages C slowly and progressively, during their stay within each of the successive ambients 6a-6g, from a maximum height to a minimum height.

This allows advantageously exploiting the fact that the $CO_2$ gas, being heavier than air, tends to precipitate and collect towards the bottom: therefore the increase in its concentration in the manner described above by increasing the rate can be conveniently obtained, for equal amounts of $CO_2$ released into the chamber 1, by placing the drawer-like cages C at gradually decreasing heights.

In this way, it is possible to control, in an extremely effective and precise manner, the exposure of poultry to predicted concentrations of $CO_2$.

With the configuration described above, the chamber 1 can be positioned at the same level of the slaughterhouse floor, indicated with P in FIG. 5, which is particularly advantageous compared to existing installations in which the gas-stunning chamber is instead arranged within a pit that extends below the floor P, with the obvious installation complications that result.

It should also be noted that the capacity of the stunning apparatus according to the invention can be varied by placing an ascending or descending number of drawer-like cages C in each of the superimposed rows. An apparatus produced with a width to accommodate, for example, six drawer-like cages C for each row can operate at a reduced capacity by providing less than six drawer-like cages C for each row, but without affecting the transit times or the effectiveness of the stunning by separate multiple rates. In such a case, neither the time, nor the displacement speed, of the drawer-like C cages that are simultaneously moved, would be varied, which is particularly advantageous in view of the fact that the ambient containing the $CO_2$ is very sensitive to displacement of masses that move with different speeds through the gas, thus disturbing it and altering the concentration state. This results in a further advantage compared to known stunning systems in which the speed of movement of the poultry through the chamber is variable, disturbing and altering the state of the gas.

Of course, the details of construction and the embodiments may vary widely with respect to those described and illustrated without departing from the scope of the present invention as defined by the following claims.

The invention claimed is:

1. A method for stunning poultry in a slaughterhouse, comprising:
supplying a stunning gas into a closed chamber through which poultry is advanced between an inlet and an outlet, wherein a concentration of said stunning gas is at a minimum at the inlet and at a maximum before the outlet of said chamber;
the poultry advanced through a plurality of ambients of said chamber, said chamber having a plurality of initial ambients and a successive ambient;
increasing a concentration of the stunning gas progressively within a first initial ambient of said initial ambients and within a second initial ambient of said initial ambients;

increasing the concentration within said successive ambient; and wherein a first rate of increase of said concentration within said first initial ambient and a second rate of increase of said concentration within said second initial ambient is less than a third rate of increase of said concentration within said successive ambient.

2. A method according to claim 1, wherein said first rate is of the order of 10%, up to a concentration of the stunning gas of about 40%.

3. A method according to claim 1, wherein the poultry is maintained within each of said ambients for a time of the order of one minute.

4. A method according to claim 1, wherein the poultry within said successive ambients is progressively lowered from a maximum height at the inlet to a minimum height before the outlet of said chamber.

5. A method according to claim 1, wherein the poultry is introduced into said chamber within drawer-like cages arranged in groups of superimposed rows.

6. An apparatus for stunning poultry in a slaughterhouse by means of a stunning gas, comprising:
a closed chamber having an inlet and an outlet between which the poultry is advanced through said chamber, wherein the concentration of said stunning gas is at a minimum at the inlet and at a maximum before the outlet, the chamber being subdivided into a plurality of initial ambients and a successive ambient of temporary stay of the poultry
a concentration of the stunning gas progressively increasing within a first initial ambient of said initial ambients and within a second initial ambient of said initial ambients and the concentration increasing within said successive ambient, wherein a first rate of increase of said concentration within said first initial ambient and a second rate of increase within said second initial ambient is less than a third rate of increase of said concentration within said successive ambient.

7. An apparatus according to claim 6, wherein said first rate is of the order of 10% up to a concentration of the stunning gas of about 40%.

8. An apparatus according to claim 6, wherein said ambients are seven in number.

9. An apparatus according to claim 6, wherein the chamber is provided with stepwise-advancement means of drawer-like cages containing the poultry through said successive ambients and for maintaining them within each one of said ambients for a preset time.

10. An apparatus according to claim 9, wherein said preset time is of the order of one minute.

11. An apparatus according to claim 9, wherein said successive ambients extends lower than a preceding one, and said advancement means are configured so as to progressively lower said drawer-type cages within each of said successive ambients from a maximum height to a minimum height.

12. An apparatus according to claim 9, wherein said chamber is sized in order to house, within each one of said successive ambients, groups of said drawer-like cages in superimposed rows.

13. An apparatus according to claim 6, wherein said chamber is located substantially at the same level of the slaughterhouse floor.

* * * * *